Dec. 15, 1925

B. H. ANIBAL

BRAKE MECHANISM

Filed May 22, 1924

1,565,614

2 Sheets-Sheet 1

Inventor
B. H. Anibal
By his Attorney
Edward N. Pagelsen

Dec. 15, 1925.
B. H. ANIBAL
1,565,614
BRAKE MECHANISM
Filed May 22, 1924    2 Sheets-Sheet 2
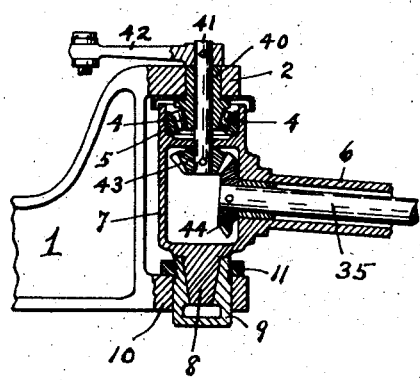
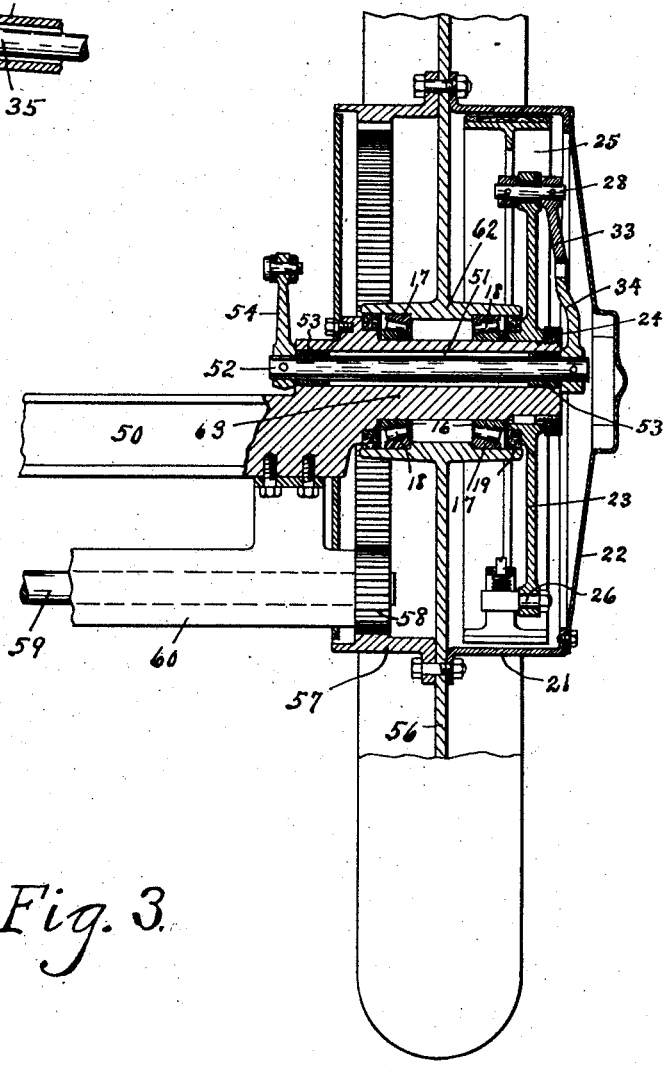
Inventor
B. H. Anibal
By his Attorney
Edward N. Pagelsen Patented Dec. 15, 1925.

1,565,614

UNITED STATES PATENT OFFICE.

BENJAMIN H. ANIBAL, OF DETROIT, MICHIGAN.

BRAKE MECHANISM.

Application filed May 22, 1924. Serial No. 715,052.

*To all whom it may concern:*

Be it known that I, BENJAMIN H. ANIBAL, a citizen of the United States, and residing at Detroit, in the county of Wayne and State of Michigan, have invented a new and Improved Brake Mechanism, of which the following is a specification.

This invention relates to the brakes for vehicle wheels, particularly to brakes for such wheels as are mounted on stub-axles which are adapted to be swung to steer the vehicles, and its object is to provide brakes which are mounted on the outer sides of the wheels and hollow axles which permit parts of the brake operating mechanism to extend through to the inner sides of these wheels so they may there connect to proper devices for setting the brakes.

This invention consists, in combination with a hollow axle and a vehicle wheel mounted thereon, of a brake mechanism mounted on the outer side of said wheel, a brake actuating shaft extending through the axle, and means on the inner end of the shaft to operate the brake.

It further consists in a pivotal connection at the inner end of said shaft in alinement with the pivot of the axle when the wheel which carries the brake is a steering wheel.

It also consists in the details of construction illustrated in the accompanying drawings and particularly pointed out in the claims.

Figure 1:
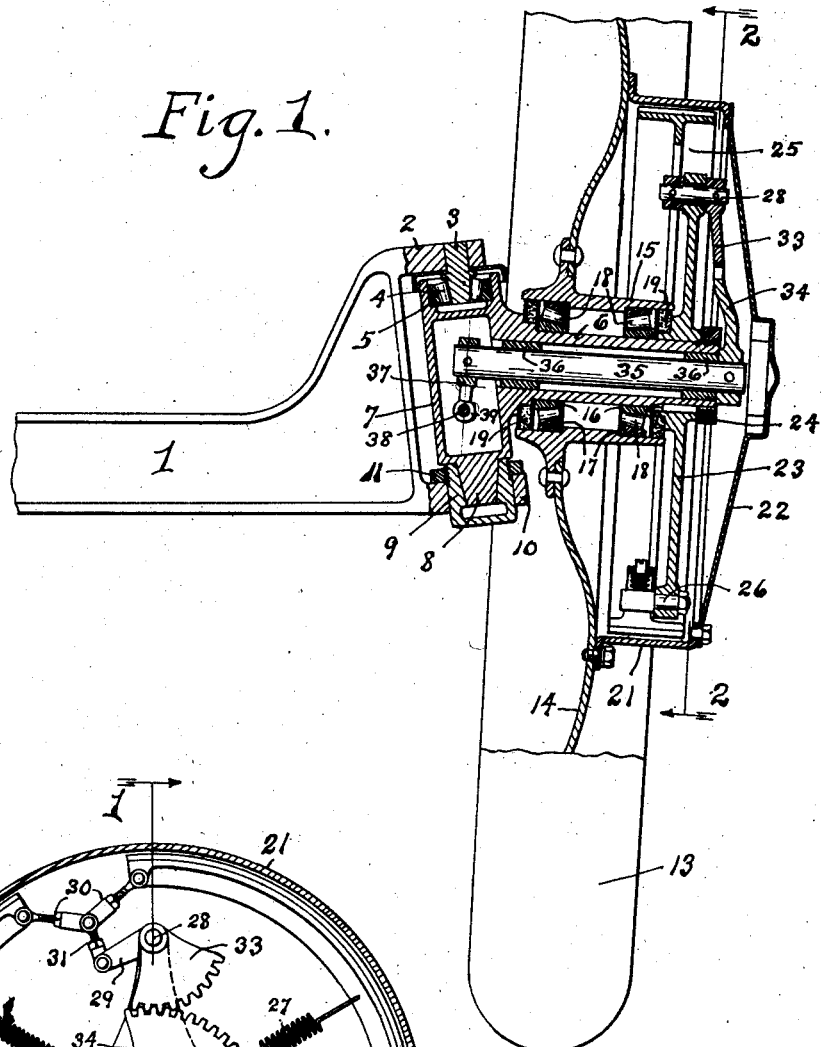
Figure 2:
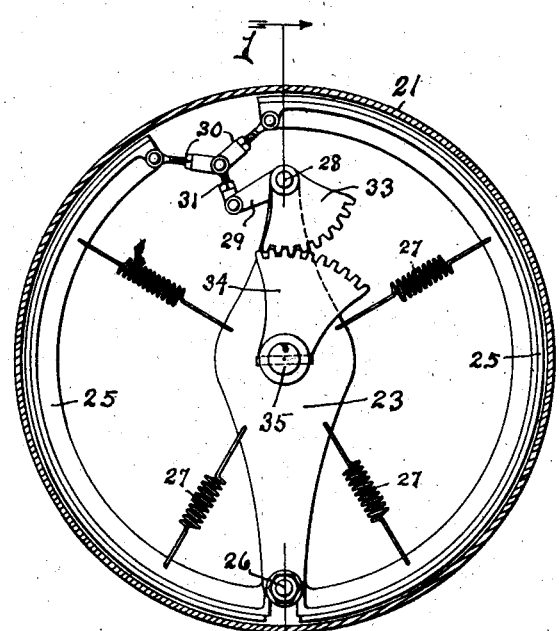

In the accompanying drawings, Fig. 1 is a vertical central section of a vehicle wheel and its axle mechanism, the brake portion being on the line 1—1 of Fig. 2. Fig. 2 is a section of the brake mechanism on the line 2—2 of Fig. 1. Fig. 3 is a view similar to Fig. 1 of a driving wheel of a vehicle and the axle mechanism therefor. Fig. 4 is a vertical section of another pivot construction for a dirigible vehicle wheel.

Similar reference characters refer to like parts throughout the several views.

The axle 1 shown in Fig. 1 is of any desired construction, its upper arm 2 having a downwardly extending pin 3 which engages the bearing rollers 4 mounted in a bearing ring 5. The stub-axle 6 is hollow and has a hollow head 7 in whose upper end this bearing ring 5 is mounted. The tapering lower end 8 of this head is mounted in a bushing 9 adjustably held in place in the lower arm 10 of the axle 1 by a nut 11. Any desired type of steering arm may be attached to this head 7.

A wheel is mounted on the stub-axle 6 and consists of a tire 13, a disk 14 and a hub 15. Bearing rings 16 and 17 and bearing rollers 18 are interposed between the hub 15 and the stub-axle 6 and dust rings 19 of any desired construction may be mounted in the ends of the hub.

A brake drum 21 is secured to the outer side of the disk 14 in any desired manner and a disk 22 may be attached thereto to exclude dust. A brake mechanism is mounted within the drum, being supported by the plate 23 which is mounted on the end of the stub-axle 6 and held in place by a nut 24. The brake shoes 25 are slidable and pivoted on a pin 26 at the lower end of the plate 23, and these shoes may be normally held away from the drum 21 by the springs 27 if desired. A shaft 28 at the upper end of the plate 23 has a lever 29 secured to its inner end, which lever connects to the free ends of the brake shoes 25 by means of the toggle links 30 and 31.

A segmental gear 33 connected to the outer end of the small shaft 28 meshes with the segmental gear 34 secured to the outer end of the central shaft 35 which is mounted in bushings 36 in the stub-axle 6. Any desired means may be employed to rotate the shaft 35. In Fig. 1 I have shown an arm 37 to whose lower end a link or push rod 38 may be attached by means of a ball and socket joint 39, the head 7 being formed with an opening to permit the entrance of such rod or link 38.

When the shaft 35 is turned by means of the rod 38 to swing the segmental gear 34 to the left in Fig. 2, the arm 29 swings up and forces apart the free ends of the brake shoes 25 and causes these shoes to engage the brake drum 21. Any desired type of internal brakes may be employed and I do not desire to be limited therein as to details, excepting as set forth in the following claims. Another example of the mechanism which may be employed to turn the shaft 35 is shown in Fig. 4.

The pin 40 which extends down from the arm 2 of the axle 1 is hollow and receives a substantially vertical shaft 41 which may be turned by a crank arm 42 and by any desired mechanism attached thereto. A bevel gear 43 on the lower end of this shaft meshes with the bevel gear 44 on the shaft 35 in the stub-axle 6 and this shaft 35 is therefore readily turned by swinging the crank arm 42.

In Fig. 3 a rigid axle 50 is shown formed with a longitudinal hole 51 to receive the shaft 52, bearing bushings 53 being provided if desired. A crank arm 54 is on the inner end of this shaft and the same segmental gear 34 previously described on the outer end. The brake shoes 25 and the connections between them and the segmental gear 33, the small shaft 28 and the supporting pin 26 mounted in the plate 23, the brake drum 21 and the cover 22 may again be employed.

The brake drum 21 is attached to the outer side of a wheel disk 56 to whose inner side an internal gear 57 is secured. A pinion 58 is mounted on a driving shaft 59 journaled in a bracket 60 and connects to any desired type of differential gearing or other source of power. The disk 56 connects to a hub 62 which is carried by the roller bearings 17—18 mounted on the outer end 63 of the axle 50. The brake is applied by swinging the crank arm 54.

I claim:—

1. In combination, a hollow axle, a wheel mounted thereon, a brake mechanism attached to the outer side of the wheel, and means extending through the axle and through the wheel from said brake mechanism to the inner side of the wheel for operating said brake mechanism.

2. In combination, a main axle and a hollow stub-axle pivotally connected thereto, a wheel rotatably mounted on said stub-axle, a brake mechanism attached to the outer side of said wheel, and means extending through said axle and wheel for operating said brake mechanism.

3. In combination, a hollow axle, a wheel mounted thereon, a brake mechanism attached to the outer side of the wheel, a shaft extending through said axle and connecting at its outer end to the brake mechanism, and means on the inner end of said shaft to turn it to operate the brake mechanism.

4. In combination, a hollow axle, a wheel mounted thereon, a brake drum attached to the outer side of the wheel, a pair of brake shoes, means mounted on the axle to support adjacent ends of the shoes, a shaft rotatably mounted in said axle, and means connected to the outer end of said shaft to separate the other ends of said shoes to cause the shoes to engage said brake drum.

5. In combination, a hollow axle, a wheel mounted thereon, a brake drum attached to the outer side of the wheel, a pair of brake shoes, means mounted on the axle to support adjacent ends of the shoes, a shaft rotatably mounted in said axle, and means comprising segmental gears connected to the outer end of said shaft and toggle links connected to the shoes to separate the other ends of said shoes to cause the shoes to engage said brake drum.

6. In combination, a hollow axle, a wheel mounted thereon, a brake drum attached to the outer side of the wheel, a pair of brake shoes, means mounted on the axle on the outer side of the wheel to support adjacent ends of the shoes, a shaft rotatably mounted in said axle, means connected to the outer end of said shaft to separate the other ends of said shoes to cause the shoes to engage said brake drum, and a cover attached to the outer edge of the brake drum to exclude dirt from the brake mechanism.

7. In combination, a main axle and a hollow stub-axle pivoted thereto, a wheel mounted on said stub-axle, a brake mechanism attached to the outer side of said wheel, a shaft extending through said axle and operatively connected at its outer end to the brake mechanism, and means connected to the inner end of the shaft to operate it and the brake mechanism, said means embodying a part in alinement with the pivot of said stub shaft.

BENJAMIN H. ANIBAL.